(12) United States Patent
Kimura et al.

(10) Patent No.: US 7,115,337 B2
(45) Date of Patent: Oct. 3, 2006

(54) FUEL CELL

(75) Inventors: Hidekazu Kimura, Minato-ku (JP);
Suguru Watanabe, Minato-ku (JP);
Tsutomu Yoshitake, Minato-ku (JP);
Sadanori Kuroshima, Minato-ku (JP);
Shin Nakamura, Minato-ku (JP);
Yuichi Shimakawa, Minato-ku (JP);
Takashi Manako, Minato-ku (JP);
Hideto Imai, Minato-ku (JP); Yoshimi Kubo, Minato-ku (JP)

(73) Assignee: NEC Corporation, Tokyo (JP)

( * ) Notice: Subject to any disclaimer, the term of this patent is extended or adjusted under 35 U.S.C. 154(b) by 83 days.

(21) Appl. No.: 10/727,547

(22) Filed: Dec. 5, 2003

(65) Prior Publication Data

US 2004/0219412 A1  Nov. 4, 2004

(51) Int. Cl.
*H01M 8/10* (2006.01)
*H01M 2/00* (2006.01)
*H01M 2/14* (2006.01)

(52) U.S. Cl. .............................. 429/41; 429/34; 429/38; 429/30; 429/32; 429/44; 429/35

(58) Field of Classification Search ................. 429/41, 429/34, 38, 30, 32, 44
See application file for complete search history.

(56) References Cited

U.S. PATENT DOCUMENTS

2004/0086762 A1* 5/2004 Maeda et al. ................. 429/32
2004/0137305 A1* 7/2004 Inoue et al. ................... 429/36

FOREIGN PATENT DOCUMENTS

JP  2002-110215  4/2002
JP  2002-544650  12/2002

* cited by examiner

*Primary Examiner*—Patrick Joseph Ryan
*Assistant Examiner*—Angela J. Martin
(74) *Attorney, Agent, or Firm*—Sughrue Mion, PLLC (57) ABSTRACT

A plurality of fuel electrodes are disposed on one surface of a solid polyelectrolyte membrane, while a plurality of oxidizer electrodes are disposed on the other surface of the same to create a plurality of unit cells which share the solid polyelectrolyte membrane. These unit cells are electrically connected through connection electrode extending through the solid polyelectrolyte membrane. A groove is formed in a region of the solid polyelectrolyte membrane between adjacent unit cells. This groove limits the migration of hydrogen ions to adjacent unit cells to prevent a reduction in voltage. The resulting solid polymer fuel cell, which is in a simple structure and reduced in size, can provide high power.

23 Claims, 5 Drawing Sheets

FUEL CELL

TECHNICAL FIELD

The present invention relates to a fuel cell which generates electric power with a liquid fuel directly supplied to fuel electrodes thereof.

BACKGROUND ART

A solid polymer fuel cell typically comprises an ion exchange membrane made of a solid polyelectrolyte membrane such as a perfluorosulphonic acid membrane; electrodes formed on both surfaces of the ion exchange membrane (a fuel electrode and an oxidizer electrode); and a charge collector. This is a device in which hydrogen is supplied to the fuel electrode, while the oxidizer electrode is supplied with oxygen or air, to generate electric power through an electro-chemical reaction. Each of the electrodes has a catalyst layer comprising a mixture of carbon particulates holding a catalyst material with a solid polyelectrolyte, and a gas diffusion layer (supply layer) made of a porous carbon material for supplying and diffusing a fuel and an oxidizing gas. The charge collector is made of an electrically conductive sheet made of carbon or metal.

In such a fuel cell, a fuel supplied to a fuel electrode reaches a catalyst through fine pores in a gas diffusion layer (supply layer). Then, the fuel is decomposed by the action of the catalyst to generate electrons and hydrogen ions. The electrons are led out to an external circuit through catalyst carriers (carbon particulates) and the gas diffusion layer (supply layer) within the fuel electrode, and flows into an oxidizer electrode through the external circuit. The hydrogen ions in turn reach an oxidizer electrode through an electrolyte in the fuel electrode and a solid polyelectrolyte membrane between both electrodes, and react with oxygen supplied to the oxidizer electrode and electrons flowing into the oxidizer electrode through the external circuit to produce water. As a result, electrons flow from the fuel electrode to the oxidizer electrode in the external circuit, electric power being taking out.

However, in a single solid polymer fuel cell unit basically configured as described above, the resulting voltage generated by the cell corresponds to a potential difference through oxidization and reduction at each of the electrodes, so that the fuel cell merely generates approximately 1.23 volts at maximum, even if it is an ideal open voltage. Thus, the fuel cell cannot always generate sufficient power as a driving power supply equipped in a variety of devices. For example, portable electronic devices typically require an input voltage of approximately 1.5–4 volts or higher as a power supply. For using the solid polymer fuel cell as a power supply for driving such a portable electronic device, unit cells of the fuel cell must be connected in series to increase the voltage generated thereby.

It is contemplated that unit cells are stacked for increasing the voltage to ensure a sufficient voltage. However, such a structure will be larger in overall thickness of the fuel cell, making this strategy unfavorable for a power supply for driving a portable electronic device which is required to be increasingly thinner.

Japanese Patent Laid-open No. 273696/96, for example, discloses a fuel cell assembly including a plurality of unit cells on the same plane, and a stacked structure which comprises a plurality of the fuel cell assemblies stacked one on another, as a technique for increasing a voltage generated by the cell while reducing the thickness of the cell.

Also, Japanese Patent Laid-open No. 171925/96 and Japanese Patent Laid-open No. 110215/2002 discloses a fuel cell assembly which has a single electrolyte membrane, a plurality of oxidizer electrodes on one surface of the electrolyte membrane, and a plurality of fuel electrodes on the other surface of the electrolyte membrane, such that a plurality of unit cells are disposed on the same plane.

Since the foregoing conventional fuel cell assembly is capable of generating a high voltage with a plurality of electrically connected cells, this fuel cell assembly provides a certain benefit in that a sufficient supply voltage can be obtained for driving an electronic device.

However, in the stacked structure described in Japanese Patent Laid-open No. 273696/96, the fuel electrodes and oxidizer electrodes of the respective unit cells disposed on a plane are not uniform in orientation, so that a fuel and an oxidizer gas must be supplied separately to each unit cell. Also, a retainer mechanism is required for sealing each unit cell in order to prevent the fuel and oxidizer gas within each unit cell from flowing into adjacent unit cells. These requirements make the spacing between the unit cells of the fuel cell assembly dependent on the dimensions of a mechanism for supplying the fuel and oxidizer gas as well as the retainer mechanism; therefore, it is difficult to achieve a sufficient reduction in size. In addition, the disclosed stacked structure requires a large number of components, and still has room for improvements in terms of a reduction in size and cost.

On the other hand, the fuel cell assembly disclosed in Japanese Patent Laid-open No. 171925/96 has a problem that hydrogen ions generated in a fuel electrode of a certain unit cell migrate (electrically leak) to an oxidizer electrode of an adjacent unit cell, not to an oxidizer electrode of the unit cell itself to cause a lower voltage. Particularly, the electric leak is remarkable when the unit cells are arranged at intervals as small as the thickness of the electrolyte membrane, inevitably reducing the voltage.

On the other hand, the throughhole connection system described in Japanese Patent Laid-open No. 110215/2002 has a problem of an electric leak caused by hydrogen ions migrating to an electrically conductive member inserted through a throughhole, in addition to an electric leak to adjacent oxidizer electrodes. Likewise, in this structure, the electric leak is more remarkable particularly when unit cells are arranged at smaller intervals, causing a larger reduction in voltage.

DISCLOSURE OF THE INVENTION

In view of the circumstances described above, it is an object of the present invention to provide a liquid fuel supply type fuel cell of a simple structure and a reduced size, which is capable of generating a high power.

To solve the problems mentioned above, the present invention provides a liquid fuel supply type fuel cell which includes a single solid electrolyte membrane, a plurality of fuel electrodes disposed on one surface of the solid electrolyte membrane, and a plurality of oxidizer electrodes disposed on the other surface of the solid electrolyte membrane in opposition to the plurality of fuel electrodes, respectively, wherein a plurality of unit cells, each comprising a fuel electrode, an oxidizer electrode, and the solid electrolyte membrane, are electrically connected to each other. The liquid fuel supply type fuel cell of the present invention has two or more unit cells sharing the solid electrolyte membrane, electrically connected to each other. Since no extra member is required for fixing the unit cells to each other, the resulting fuel cell of a simple structure can provide high power.

Further, since the fuel electrodes are disposed on one surface of the solid electrolyte membrane, and the oxidizer electrodes on the other surface of the same, it is unnecessary to prepare flow paths or the like for individually supplying a fuel or an oxidizer to each unit cell, but two or more unit cells can be collectively supplied with the fuel and oxidizer. Consequently, the structure can be simplified, leading to reduction in size of the fuel cell.

Also, the liquid fuel supply type fuel cell of the present invention further comprises an electrically conductive member extending through the solid electrolyte membrane, such that at least two of the plurality of unit cells are connected in series through the electrically conductive member. In this way, the unit cells can be connected in series without increasing a projection area. Consequently, the overall cell can be further reduced in size.

Preferably, the liquid fuel supply type fuel cell described above further comprises a sealing material interposed between the electrically conductive member and solid electrolyte membrane. When a gap exists between the electrically conductive member and solid electrolyte membrane, a fuel is mixed with an oxidizer to be wasted. However, the seal material thus provided can completely cover the gap formed between the electrically conductive member and solid electrolyte membrane, thereby preventing waste of the fuel.

Further preferably, in the liquid fuel supply type fuel cell described above, the electrically conducive member has a surface coated with an insulating material. When a unit cell is disposed in close proximity to the electrically conductive member, hydrogen ions generated on the fuel electrode of the unit cell may migrate to the electrically conductive member rather than to the associated oxidizer electrode. The migration would cause reduction in voltage, as is the case with an electric leak. Thus, the insulating material coated on the surface of the electrically conductive member can prevent the migration of hydrogen ions to the electrically conductive member, thereby limiting reduction in voltage.

Also preferably, the liquid fuel supply type fuel cell described above comprises a low ion conductive region of the solid electrolyte membrane between the unit cells. In the liquid fuel supply type fuel cell of the present invention, the spacing between respective unit cells can be narrowed to further reduce the size of the fuel cell. However, reduction in the spacing between unit cells gives rise to a problem of electric leak, as mentioned above, which causes a lower voltage. Therefore, the low ion conductivity region is provided between adjacent unit cells in the solid electrolyte membrane to prevent the electric leak. Thus, even if the spacing between the respective unit cells is reduced to the same extent as the thickness of the solid electrolyte membrane, the resulting liquid fuel supply type fuel cell can limit reduction in voltage, and provide high power, in a small-size and small-thickness. The low ion conductivity region in the present invention refers to a region which exhibits a lower conductivity for hydrogen ions than the remaining regions.

In the present invention, the low ion conductivity region may be a region having a groove in the solid electrolyte membrane of the liquid fuel supply type fuel cell described above.

Alternatively, the low ion conductivity region may be a region having a recess in the solid electrolyte membrane of the liquid fuel supply type fuel cell described above.

The low ion conductivity region can be provided by the structure as mentioned above, and can prevent the migration of hydrogen ions between unit cells through the solid electrolyte membrane, resulting in the realization of a fuel cell which provides high power by effectively limiting reduction in voltage.

In the present invention, the groove or recess may be filled with an insulating resin in the liquid fuel supply type fuel cell described above. The groove or recess filled with an insulating resin can further limit the migration of hydrogen ions between the unit cells through the solid electrolyte membrane, so that the resulting fuel cell can provide higher power. The insulating resin used for the purpose is preferably a fluorine-based resin, a polyimide-based resin, a phenol-based resin, or an epoxy-based resin. By using these resins, the groove or recess can be readily filled with the insulating resin without fail.

Also, according to the present invention, the liquid fuel supply type fuel cell described above further comprises a fuel flow path for supplying a fuel to two or more of the fuel electrodes, wherein the fuel flow path has a partition, part of which comprises the solid electrolyte membrane. Since this fuel cell utilizes the solid electrolyte membrane as part of the partition of the fuel flow path, this results in a smaller number of components and in a simple structure. Consequently, this can contribute to a reduction in size and thickness of the overall fuel cell.

Also, according to the present invention, at least two of the plurality of unit cells may be connected in parallel in the fuel cell described above. In the liquid fuel supply type fuel cell of the present invention, a plurality of unit cells can be freely connected in parallel, so that the resulting fuel cell can obtain a desired voltage or a current value.

As described above, the present invention can provide a solid polymer fuel cell which has a simple structure, generates high power, and is reduced in size and thickness.

BEST MODE FOR CARRYING OUT THE INVENTION

Fuel cells according to several embodiments of the present invention will be described in terms of the structure and operation with reference to FIGS. 1A to 5B, as follows.

Figure 2A:
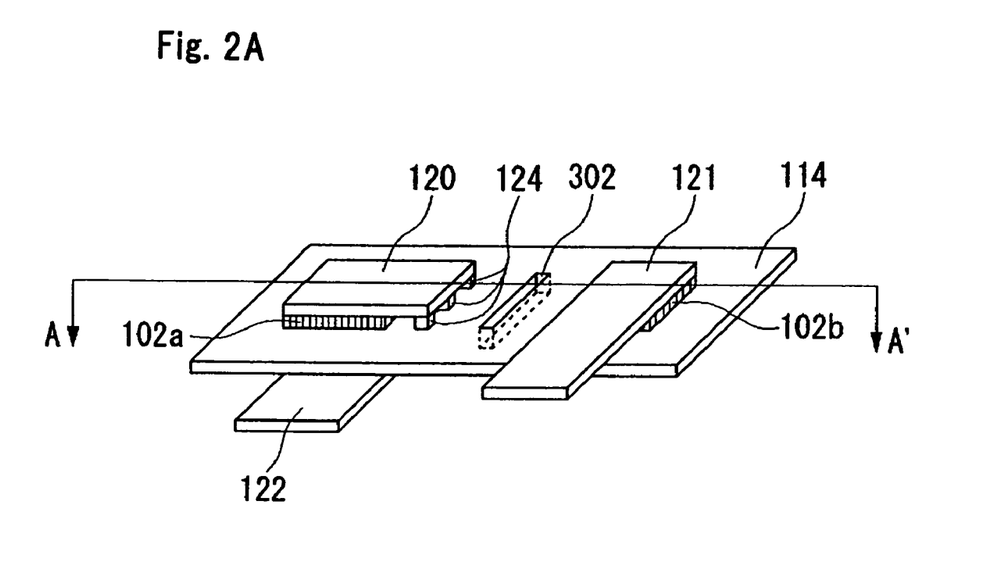
FIGS. 2A and 2B illustrate another embodiment of a fuel cell according to the present invention.
Figure 2B:
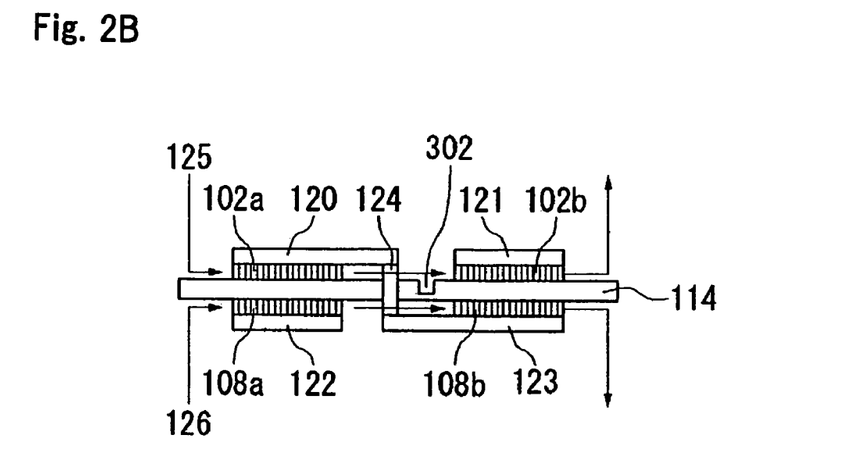

FIG. 2A is a perspective view schematically illustrating the structure of a fuel cell according to one embodiment of the present invention. FIG. 2B is a cross-sectional view taken along line A–A' in FIG. 2A. As illustrated in FIGS. 2A and 2B, fuel electrodes (one type of electrode) 102, 102b are disposed on one surface of single and common solid polyelectrolyte membrane 114, while oxidizer electrodes (the other type of electrode) 108a, 108b are disposed on the other surface of solid polyelectrolyte membrane 114. Charge collectors 120, 121 are disposed on and connected to fuel electrodes 102a, 102b, respectively, while charge collectors 122, 123 are disposed on and connected to oxidizer electrodes 108a, 108b, respectively. Charge collectors 121, 122 are electrically connected by connection electrode 124 extending through solid polyelectrolyte membrane 114. Fuel electrodes 102a, 102b and oxidizing electrodes 108a, 108b comprises a base (gas diffusion layer) and a catalyst layer, both not shown.

In the fuel cell structured as described above, fuel electrodes 102a, 102b are supplied with fuel 125, while oxidizer electrodes 108a, 108b are supplied with oxidizer 126 such as air, oxygen, or the like, as illustrated in FIG. 2B. In the fuel cell of this embodiment, fuel electrodes 102a, 102b and oxidizer electrodes 108a, 108b, forming part of a plurality of unit cells, are disposed on both surfaces of solid polyelectrolyte membrane 114. Therefore, as schematically illustrated in FIG. 2B, a single fuel flow path is sufficient for supplying fuel 125, while a single oxidizer flow path is sufficient for supplying oxidizer 126, thereby making it possible to simplify the structure of the fuel cell. Solid polyelectrolyte membrane 114 serves as a partition for separating the fuel electrode side from the oxidizer electrode side, thus preventing fuel 125 from being introduced into the oxidizer electrode side and oxidizer 126 from being introduced into the fuel electrode side.

Solid polyelectrolyte membrane 114 separates fuel electrodes 102a, 102b from oxidizer electrodes 108a, 108b and serves as an ion exchange membrane for forcing hydrogen ions to migrate between these electrodes. For this action, solid polyelectrolyte membrane 114 preferably has a high conductivity for hydrogen ions. Also preferably, solid polyelectrolyte membrane 114 is chemically stable and mechanically strong. Materials suitably used to form solid polyelectrolyte membrane 114 may be strong acid groups such as a sulfone group, a phosphate group, a phosphone group, a phosphine group, and the like, or organic polymers having a polar group such as a weak acid group such as a carboxyl group. Such organic polymers may be exemplified by aromatic series containing polymers such as sulfonated poly(4-phenoxybenzoil-1,4-phenylene), alkyl sulfonated polybenzoimidazol, and the like; copolymers such as polystyrene sulfonic copolymer, polyvinyl sulfonic copolymer, bridging alkyl sulfonic derivative, fluorine containing polymer composed of a fluoropolymers skeleton and sulfonic acid; a copolymer produced by copolymerization of an acrylic amid class such as acrylic amid-2-methyl propane sulfonic acid and an acrylate class such as n-butyl methacrylate; perfluorocarbone containing a sulfone group (For example, Nafion (trade name) made by Dupont, Aciplex (trade name) made by Asahi Kasei Corporation); perfluorocarbone containing a carboxyl group (for example, Flemion S film (trade name) made by Asahi Glass Co., Ltd.); and the like.

When an aromatic series containing polymer is selected such as sulfonated poly(4-phenoxybenzoil-1,4-phenilyene), alkyl sulfonic polybenzoimidazol, or the like, for an organic liquid fuel used as fuel 125, this can limit the transmission of the organic liquid fuel to prevent a reduction in cell efficiency due to cross-over.

Fuel electrodes 102a, 102b and oxidizer electrodes 108a, 108b may be created in a structure in which a film (catalyst layer) including carbon particulates holding the catalyst and solid polyelectrolyte particulates is formed on a base (gas diffusion layer). For both of the fuel electrodes and the oxidizer electrodes, used as the base may be a porous base such as carbon paper, carbon molding, carbon sinter, sintered metal, foam metal, and the like. Also, the surface of the base may be processed to be water repellent, and a water repellent agent such as polytetrafluoroethylene or the like may be used for the water-repellent processing for the base.

The catalyst held by the carbon particulates of the fuel electrodes may be exemplified by platinum, rhodium, palladium, iridium, osmium, ruthenium, rhenium, gold, silver, nickel, cobalt, lithium, lanthanum, strontium, yttrium, and the like, and they may be used alone or in a combination of two or more. On the other hand, the catalyst held on the carbon particulates of the oxidizer electrodes may be similar to those used for the catalyst of the fuel electrodes, and the materials previously exemplified can be used. The same material or different materials may be used for the catalysts of the fuel electrodes and oxidizer electrodes.

The carbon particulates for holding the catalyst may be exemplified by acetylene black (for example, Denka Black (trade name) made by Denki Kagaku Kogyo Kabushiki Kaisha, XC72 (trade name) made by Vulcan Material Company, and the like), Ketjen Black, carbon nanotube, carbon nanohorn, and the like. The carbon particulates may have a diameter in a range of 0.01 to 0.1 µm, and preferably 0.02 to 0.06 µm.

Used as fuel 125 may be an organic liquid fuel such as methanol, ethanol, diethyl ether, and the like.

Though not particularly limited, fuel electrodes 102a, 102b and oxidizer electrodes 108a, 108b may be fabricated, for example, in the following manner.

The catalyst can be held by the carbon particulates of fuel electrodes 102a, 102b and oxidizer electrodes 108a, 108b by impregnation which is generally performed. Then, the carbon particulates which hold the catalyst and the solid polyelectrolyte particulates are dispersed in a solvent to make a paste. After that, the paste is coated on the base, and dried to provide fuel electrodes 102a, 102b and oxidizer electrode 108a, 108b. Here, the diameter of the carbon particulates is set, for example, in a range of 0.01 to 0.1 µm. On the other hand, the diameter of catalyst particles is set, for example, in a range of 1 nm to 10 nm. Further, the diameter of the solid polyelectrolyte particulates is set, for example, in a range of 0.05 to 1 µm. The carbon particulates and solid electrolyte particulates are used for example, at a weight ratio in a range of 2:1 to 40:1. Also, the weight ratio of water to solute in the paste is, for example, in a range of 1:2 to 10:1. Though not particularly limited, the paste may be coated on the base by such a method as brushing, spraying, screen printing, or the like. The paste is coated in a thickness of approximately 1 µm–2 mm. After coating the paste, the base is heated at corresponding temperature and corresponding time to a type of fluoropolymer which is used to fabricate fuel electrodes 102a, 102b and oxidizer electrodes 108a, 108b. Though the heating temperature and heating time are appropriately determined depending on materials used, the heating temperature may be, for example, in a range of 100° C. to 250° C., while the heating time may be in a range of 30 seconds to 30 minutes.

Solid electrolyte membrane 114 can be fabricated by using a method suitable for a material used. For example, when solid polyelectrolyte membrane 114 is made of an organic polymer material, solid polyelectrolyte membrane 114 can be provided by casting and drying a liquid comprised of a solvent and an organic polymer material dissolved or dispersed therein on a removable sheet made of polytetrafluoroethylene or the like.

Connection electrodes 124 are provided to extend through solid polyelectrolyte membrane 114. Connection electrodes 124 are electrically conductive members for electrically connecting charge collectors 120 and 123, later described.

Connection electrodes 124 can be inserted, for example, through a throughhole previously formed through solid polyelectrolyte membrane 114. Alternatively, connection electrodes 124 may be caused to pierce directly into solid polyelectrolyte membrane and inserted therethrough while forming a throughhole, without previously forming a throughhole through solid polyelectrolyte membrane 114.

Figure 1A:
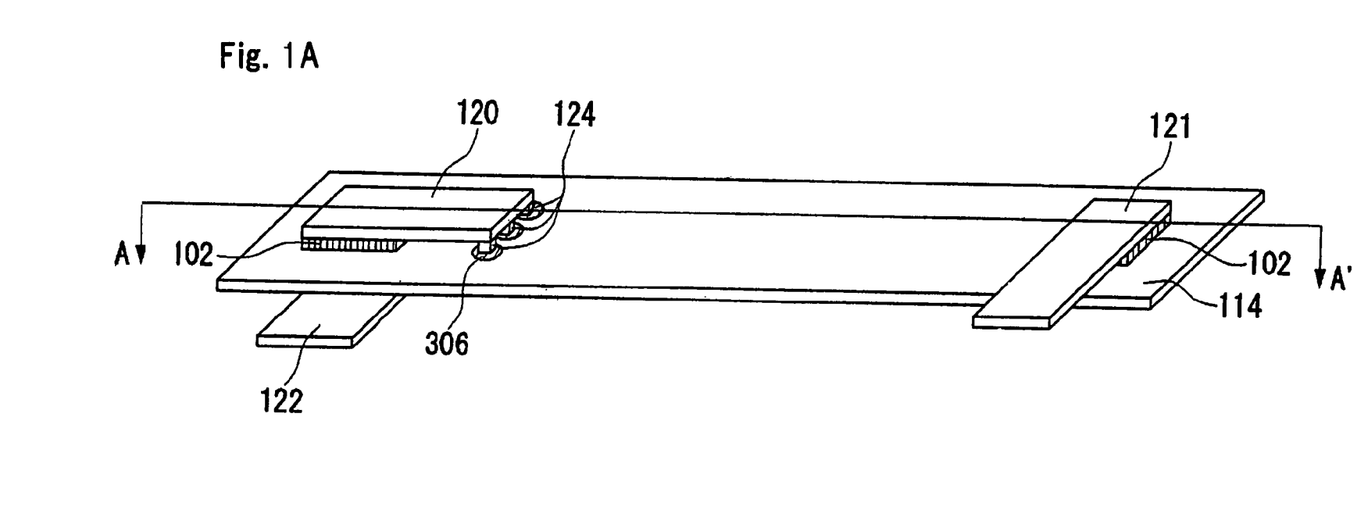
FIGS. 1A and 1B illustrate one embodiment of a fuel cell according to the present invention.
Figure 1B:
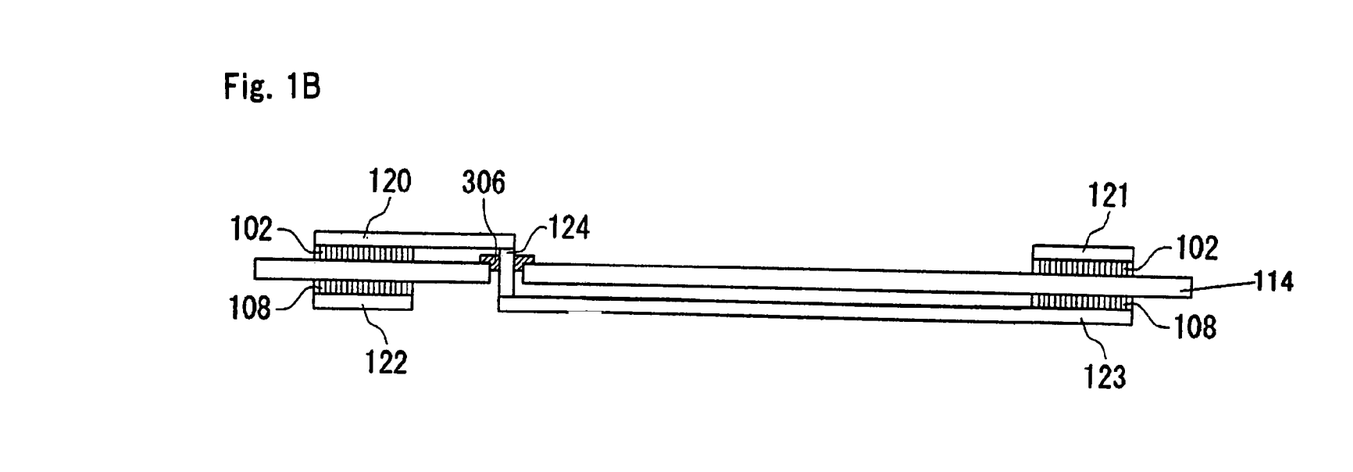

For preventing a fuel and/or an oxidizer from leaking from a gap between solid polyelectrolyte membrane 114 and connection electrodes 124, a sealing material having a hole with a diameter slightly smaller than the throughhole may be placed on the throughhole, with the hole positioned in alignment to the throughhole, as illustrated in FIGS. 1A, 1B, and connection electrodes 124 may be inserted through solid polyelectrolyte membrane 114 from above the sealing material. In this way, the gap can be completely covered between the throughhole and connection electrodes 124. Sealing material 306 used for this purpose may be, for example, a tetrafluoroethylene resin film or a silicon film.

Solid polyelectrolyte membrane 114 thus fabricated is interposed between fuel electrodes 102a, 102b and oxidizer electrodes 108a, 108b, and hot pressed to produce an electrode-electrolyte laminating structure. In this event, solid polyelectrolyte membrane 114 is made in contact with the surfaces of all electrodes 102a, 102b, 108a, 108b on which the catalysts are provided. The conditions for the hot pressing are selected depending on particular materials. When the electrolytes on the surfaces of solid polyelectrolyte membrane 114 and electrodes 102a, 102b, 108a, 108b are formed of organic polymers, the hot pressing can be conducted at a temperature exceeding the softening temperature or glass transition temperature of these organic polymers. Specifically, the hot pressing may be conducted under the conditions which define the temperature in a range of 100 to 250° C.; pressure in a range of 1 to 100 kg/cm$^2$; and duration in a range of 10 seconds to 300 seconds, by way of example.

The electrode-electrolyte laminating structure produced in the manner described above is interposed between charge collectors 120–123. Subsequently, charge collector 121 disposed on and connected to fuel electrode 102b is electrically connected to charge collector 122 disposed on and connected to oxidizer electrode 108a by connection electrode 124 extending through solid polyelectrolyte membrane 114. This results in a fuel cell which has two unit cells connected in series. Though a method of connecting connection electrodes 124 with charge collectors 120, 123 is not limited in particular, the connection can be made, for example, by caulking connection electrodes 124 on charge collector 120 and charge collector 123, or by welding. Charge collectors 120–123 and connection electrode 124 are electrically conductive members, which may be formed, for example, of stainless steel, titanium, or the like.

Since the fuel cell as described above does not require a retainer mechanism having the sealability as in the prior art, respective unit cells can be arranged in close proximity to one another to save space, thereby realizing a high density mounting. However, when the respective unit cells are arranged to reduce the interval to the same extent as the thickness of the solid polyelectrolyte membrane, an electric leak occurs, wherein hydrogen ions produced in the fuel electrode of a unit cell may migrate to the oxidizer electrode of an adjacent unit cell, not to the oxidizer electrode of the unit cell itself. The hydrogen ions migrating in this way cause a reduced voltage. Therefore, in this embodiment, groove 302 is provided in a region between unit cells as illustrated in FIGS. 2A, 2B for preventing the electric leak.

FIG. 2A is a perspective view of the structure which is provided with groove 302, and FIG. 2B is a cross-sectional view taken along line A–A' in FIG. 2A.

Figure 3A:
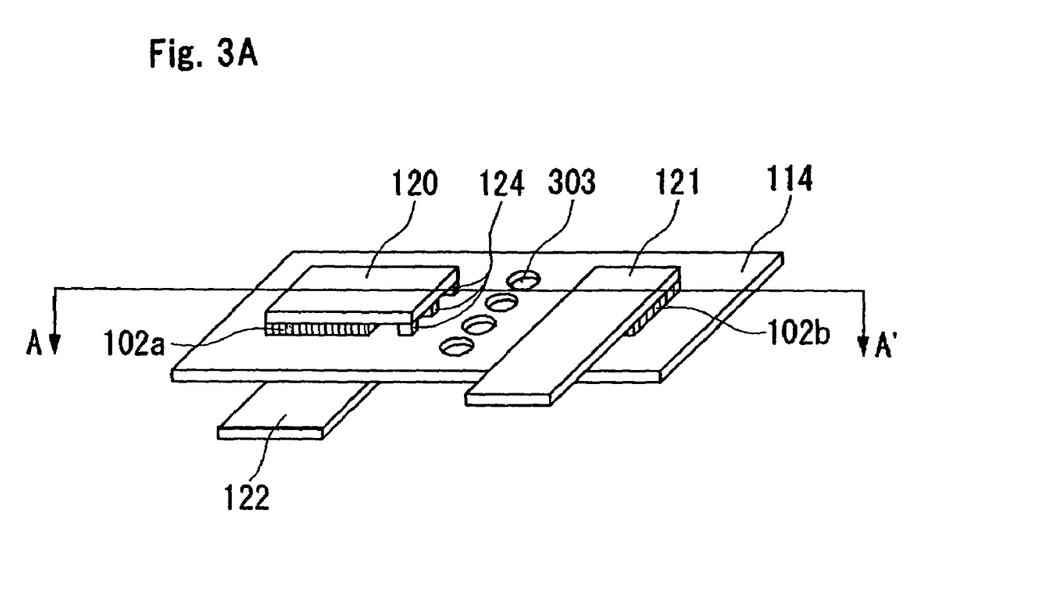
FIGS. 3A and 3B illustrate further embodiment of the fuel cell according to the present invention.
Figure 3B:
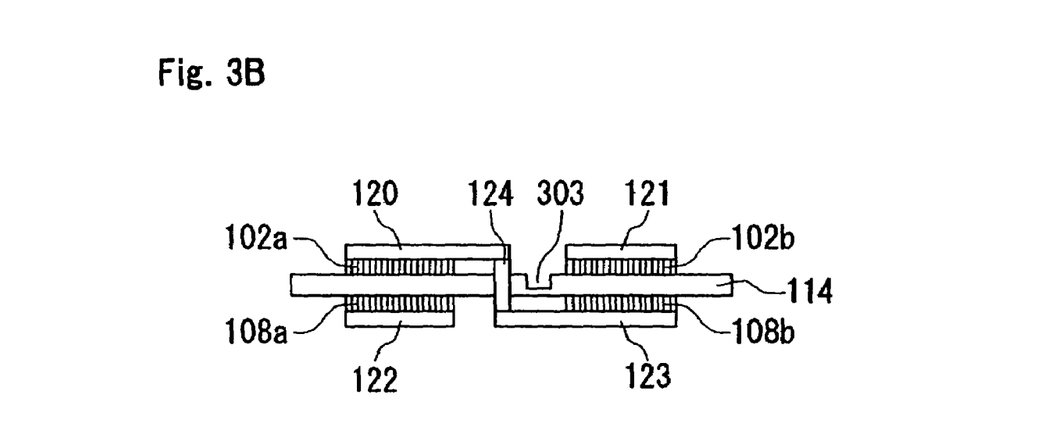

Alternatively, as illustrated in FIGS. 3A, 3B, recess 303 may be provided in a region between unit cells instead of grove 302. FIG. 3A is a perspective view of an embodiment which is provided with recess 303, and FIG. 3B is a cross-sectional view taken along line A–A' in FIG. 3A.

Groove 302 or recess 303 thus provided can reduce the ion conductivity which causes the hydrogen ions produced on fuel electrode 102a to migrate to oxidizer electrode 108b of an adjacent unit cell. Consequently, the electric leak can be prevented, and the hydrogen ions produced on fuel electrode 102a can be effectively led to oxidizer electrode 108a.

Figure 4A:
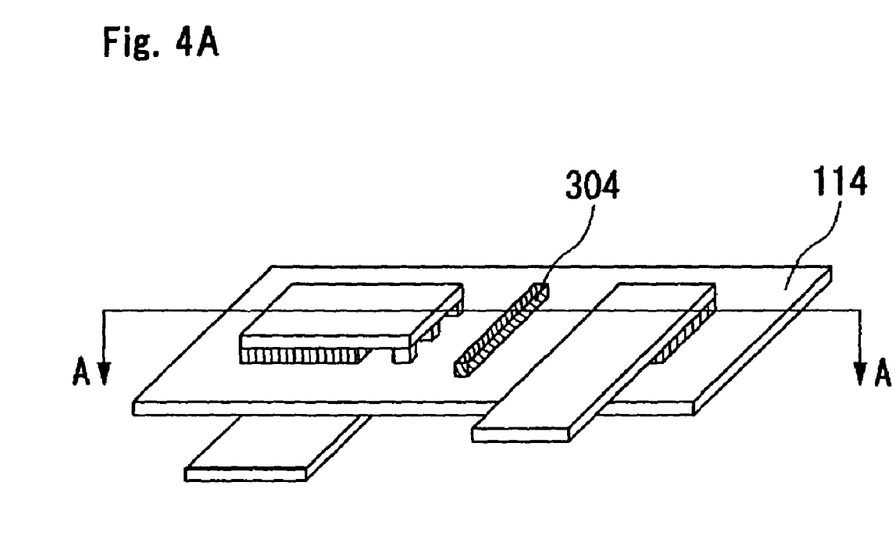
FIGS. 4A and 4B illustrate a yet further embodiment of the fuel cell according to the present invention.
Figure 4B:
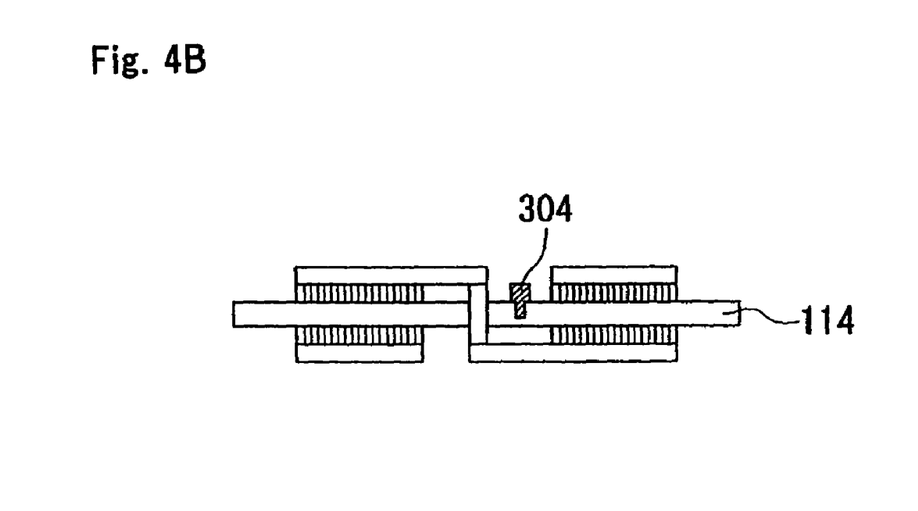
Figure 5A:
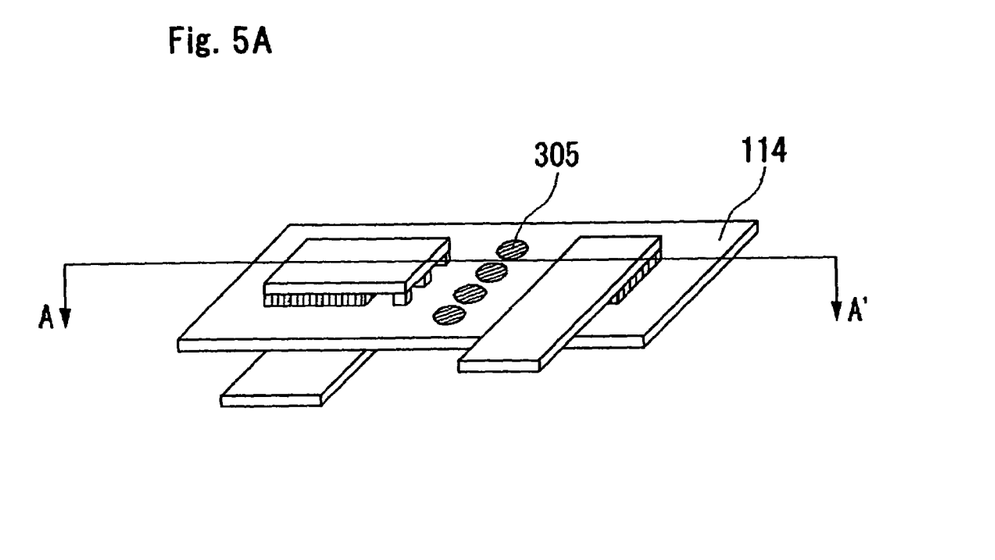
FIGS. 5A and 5B illustrate a yet further embodiment of the fuel cell according to the present invention.
Figure 5B:
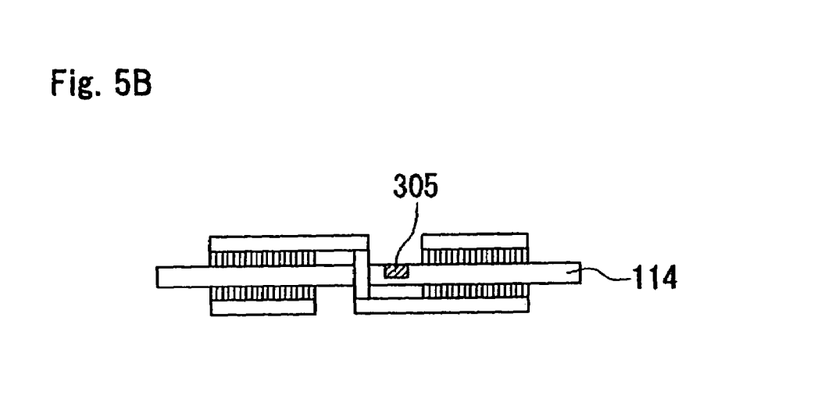

Further, groove 302 or recess 303 may be filled with a resin or the like which has insulating properties. Such structures are illustrated in FIGS. 4A, 4B, 5A, 5B. FIG. 4A is a perspective view of an embodiment in which insulating film 304 is inserted in groove 302, and FIG. 4B is a cross-sectional view taken along line A–A' in FIG. 4A. FIG. 5A in turn is a perspective view of an embodiment in which recess 303 is filled with insulating resin 305, and FIG. 5B is a cross-sectional view taken along line A–A' in FIG. 5A. The employment of such structures can further prevent the electric leak. Materials used for insulating film 304 and insulating resin 305 may be fluorine-based resin, polyimide-based resin, phenol-based resin, epoxy-based resin, and the like.

The electric leak is also caused by hydrogen ions migrating to connection electrodes 124. To prevent this electric leak, the surfaces of connection electrodes 124 are preferably coated with an insulating material. Insulating materials suitably used for this purpose may be, for example, silicon-, polytetrafluoroethylene-, polyethylene-, and polyimide-based materials. These materials may be coated in a process of vapor deposition, for example.

As described above, the respective embodiments illustrated in FIGS. 2A to 5B can prevent the electric leak, and reduce the spacing between the unit cells of the fuel cell to the thickness of solid polyelectrolyte membrane 114 or less, thereby realizing the higher density mounting.

While the respective embodiments described above have illustrated fuel cells each having two unit cells for simplification, the present invention is not limited to those fuel cells, but can be applied to a fuel cell having three or more unit cells in a similar manner.

Next, more specific examples of the present invention will be described with reference to the drawings in a comparison with comparative examples.

EXAMPLE 1

Example 1 of the present invention will be described with reference to FIGS. 1A, 1B.

Example 1 employed a platinum (Pt)—ruthenium (Ru) alloy particulate having a diameter of 3–5 nm as the catalyst, and catalyst carrier carbon particulates (Denka Black (trade name) made by Denki Kagaku Kogyo Kabushiki Kaisha) which hold the catalyst thereon by a weight percentage of 50%. The alloy includes Ru by 50 wt %, and the weight ratio of the alloy to the carbon particulate is 1:1. One gram of the catalyst carrier carbon particulates was added to 18 ml of 5 wt % nafion solution (nafion is a registered trade mark of Dupont) made by Aldrich Chemical Company, Inc., and stirred by an ultrasonic mixer for three hours at 50° C. to produce a catalyst paste. This catalyst paste was coated on a carbon paper (TGP-H-120 (trade name) made by Toray Industries, Inc.,) at 2 mg/cm² by screen printing, and dried at 120° C. to produce electrodes.

Throughholes were formed through solid polyelectrolyte membrane 114 having thickness of 150 μm made of nafion manufactured by Dupont for allowing connection electrodes 124 inserted therethrough, as described later. Four electrodes fabricated in the foregoing manner were bonded by thermocompression bonding two by two on both surfaces of single solid polyelectrolyte membrane 114 having a thickness of 150 μm which is made of nafion of Dupont, at 120° C. to prepare fuel electrodes 102a, 102b and oxidizer electrodes 108a, 108b. In this way, two unit cells were created. These two unit cells were spaced away by 2.5 mm from each other.

Then, charge collectors 120–123 made of stainless steel were disposed on and connected to fuel electrodes 102a, 102b and oxidizer electrodes 108a, 108b, respectively, such that the two unit cells were interposed between charge collectors 120–123. Further, connection electrodes 124, which are stainless steel M2 bolts coated with tetrafluoroethylene resin, were inserted through throughholes formed through solid polyelectrolyte membrane 114, and charge collector 121 and charge collector 122 were connected in series by these connection electrodes 124. When connection electrodes 124 were inserted through the throughholes, connection electrodes 124 were inserted through sealing material 306 made of tetrafluoroethylene resin placed on the throughholes, thereby completely covering the throughholes, as illustrated.

Also, though not shown, a fuel container made of tetrafluoroethylene resin was attached on the fuel electrodes 102a, 102b side of solid polyelectrolyte membrane 114. Fuel electrodes 102a, 102b were covered with the fuel container and also sealed by solid polyelectrolyte membrane 114 and this fuel container.

A 10% methanol solution was applied into the interior of the fuel cell thus fabricated at 2 ml/min, and cell characteristics were measured with the exterior being exposed to the atmosphere. As a result, the cell generated a voltage of 0.9 volts at a current density of 100 mA/cm², as shown in Table 1. This voltage corresponds twice as high as a voltage generated by a fuel cell comprising only a single unit cell. It is understood that Example 1 exhibits a good result because a sufficient spacing is ensured between the two unit cells so that the electric leak hardly occurs.

TABLE 1

| | Cell Voltage (volts) |
|---|---|
| Example 1 | 0.9 |
| Example 2 | 0.87 |
| Example 3 | 0.9 |
| Example 4 | 0.85 |
| Example 5 | 0.9 |
| Comparative Example 1 | 0.8 |

EXAMPLE 2

In Example 2 shown in FIGS. 2A, 2B, four electrodes fabricated by a similar method to that of Example 1 were bonded by thermocompression bonding two by two on both surfaces of single solid polyelectrolyte membrane 114 to prepare fuel electrodes 102a, 102b and oxidizer electrodes 108a, 108b, thus creating two unit cells. However, the two unit cells were spaced away by 0.2 mm and groove 302 having a width of 0.05 mm and a depth of 0.1 mm was formed between the two unit cells. Charge collectors 120–123 were disposed in a manner similar to Example 1, and connection electrodes 124, which were gold wires each having a diameter of 0.05 mm coated with tetrafluoroethylene resin, were inserted through solid polyelectrolyte membrane 114. Then, charge collector 121 and charge collector 122 were connected in series. The connection was made by thermocompression bonding under ultrasonic vibrations. A fuel container, not shown, was attached on the fuel electrodes 102a, 102b side of the solid polyelectrolyte membrane 114.

A 10% methanol solution was also applied into the interior of the fuel cell of Example 2 at 2 ml/min, and cell characteristics were measured with its exterior being exposed to the atmosphere. As a result, the cell generated a voltage of 0.87 volts at a current density of 100 mA/cm², as shown in Table 1. This voltage is approximately twice as high as a voltage generated by a fuel cell comprising only a single unit cell. It is understood that the electric leak is significantly limited in Example 2 in spite of a small spacing between the unit cells.

While groove 302 was formed on the right-hand side of connection electrodes 124 in Example 2, groove 302 may be formed on the left-hand side of connection electrodes 124. Also, groove 302 may extend through connection electrodes 124.

EXAMPLE 3

In Example 3 illustrated in FIGS. 4A, 4B, insulating film 304 made of polyimide (Kapton (registered trade mark) made by Dupont) was inserted into and bonded in groove 302 formed in solid polyelectrolyte membrane 114 in the structure similar to Example 2. Example 3 is similar in the rest of the structure to Example 2, and was manufactured by a method similar to that of Example 2.

A 10% methanol solution was also applied into the interior of the fuel cell of Example 3 at 2 ml/min, and cell characteristics were measured with the exterior being exposed to the atmosphere. As a result, the cell generated a voltage of 0.9 volts at a current density of 100 mA/cm², as shown in Table 1. This voltage, which is higher than that generated by Example 2, corresponds to a voltage twice as high as that generated by a fuel cell comprising only a single unit cell. It is understood that the electric leak is significantly limited in Example 3.

While groove 302 was formed on the right-hand side of connection electrodes 124 in Example 3, groove 302 may be formed on the left-hand side of connection electrodes 124. Also, groove 302 may extend through connection electrodes 124.

COMPARATIVE EXAMPLE 1

In Comparative Example 1, not shown, the fuel cell 2 is the same as the fuel cell of Example 2 in structure except that no groove 302 is formed in solid polyelectrolyte membrane 114. Such fuel cells were manufactured by the same manufacturing method as Example 2. Two unit cells were spaced away by 0.2 mm which was similar to Example 2 but different from Example 1.

A 10% methanol solution was also applied into the interior of the fuel cell of Comparative Example 1 at 2 ml/min, and cell characteristics were measured with its exterior being exposed to the atmosphere. As a result, the cell generated a voltage of 0.8 volts at a current density of 100 mA/cm², as shown in Table 1. Comparative Example 1 reduced the spacing between the two unit cells as compared with Example 1 to permit reduction in size, but caused an electric leak, thereby failing to provide a sufficient voltage.

EXAMPLE 4

In Example 4 illustrated in FIGS. 3A, 3B, a plurality of recesses 303, each having a diameter of 0.1 mm and a depth of 0.1 mm were formed in solid polyelectrolyte membrane 114 in a structure similar to Example 2 instead of groove 302. Example 4 is similar in the rest of the structure to Example 2, and was manufactured by a method similar to that of Example 2.

A 10% methanol solution was also applied into the interior of the fuel cell of Example 4 at 2 ml/min, and cell characteristics were measured with the exterior being exposed to the atmosphere. As a result, the cell generated a voltage of 0.85 volts at a current density of 100 mA/cm$^2$, as shown in Table 1. This voltage, though lower than a voltage twice as high as that generated by a fuel cell comprising only a single unit cell, is higher than that generated by Comparative Example 1. It is understood that the electric leak is limited to some extent in Example 4.

While recesses 303 were formed on the right-hand side of connection electrodes 124 in Example 4, recesses 303 may be formed on the left-hand side of connection electrodes 124. Also, recesses 303 may extend through connection electrodes 124.

EXAMPLE 5

In Example 5 illustrated in FIGS. 5A, 5B, insulating resin 305 (epoxy resin) was filled in recesses 303 formed in solid polyelectrolyte membrane 114 in a structure similar to Example 4. Example 5 is similar in the rest of the structure to Example 4, and was manufactured by a method similar to that of Examples 2–4.

A 10% methanol solution was also applied into the interior of the fuel cell of Example 5 at 2 ml/min, and cell characteristics were measured with the exterior being exposed to the atmosphere. As a result, the cell generated a voltage of 0.9 volts at a current density of 100 mA/cm$^2$, as shown in Table 1. This voltage, which is higher than the voltage generated by the fuel cell of Example 4, corresponds to a voltage twice as high as that generated by a fuel cell comprising only a single unit cell. It is understood that the electric leak is substantially limited in Example 5.

Now, description will be made on the result of the foregoing cell voltage measurements made for Examples 1–5 of the present invention and Comparative Example 1.

In Comparative Example 1, the spacing between two unit cells is reduced to the same degree (0.2 mm) as the thickness of the solid polyelectrolyte membrane to permit reduction in the size of the fuel cell. However, Comparative Example 1 suffers from a significant electric leak which causes a reduced voltage.

On the contrary, in Example 1, a wide spacing is ensured between two unit cells to provide a good result without substantially giving rise to an electric leak. However, the spacing between the unit cells is as wide as 2.5 mm.

In Example 2, the electric leak significantly experienced in Comparative Example 1 can be limited by groove 302 formed in solid polyelectrolyte membrane 114. The resulting fuel cell can provide a high voltage while the spacing between two unit cells is narrowed to the same degree (0.2 mm) as the thickness of the solid polyelectrolyte membrane to permit a reduction in the size thereof.

In Example 3, the electric leak can be further limited by insulating film 304, so that a higher voltage can be generated than in Example 2. Of course, the spacing between two unit cells is narrow enough to reduce the size of the resulting fuel cell.

In Example 4, the electric leak significantly experienced in Comparative Example 1 can be limited by recesses 303 formed in solid polyelectrolyte membrane 114, as is the case with Example 2. The resulting fuel cell can provide a high voltage while the spacing between two unit cells is narrowed down to the same degree (0.2 mm) as the thickness of the solid polyelectrolyte membrane to permit a reduction in the size thereof.

In Example 5, the occurrence of the electric leak can be further limited by insulating resin 305, as is the case with Example 3, and a higher voltage can be generated than in Example 4. Of course, the spacing between two unit cells is narrow enough to reduce the size of the resulting fuel cell.

As appreciated, it has been revealed that each of the fuel cells in Examples 2–5 can generate a higher voltage, and unit cells can be mounted at intervals of as narrow as 0.2 mm at an extremely high density. While the foregoing Examples have shown the structure in which two unit cells are electrically connected in series, the two unit cells may be connected in parallel in a similar structure by connecting the fuel electrodes (or the oxidizer electrodes) of two unit cells to each other. In the foregoing Examples, the voltage generated by the cell is approximately 0.9 volts which cannot be said to be sufficient as a power supply for driving a portable device, however, the voltage or current can be increased by electrically connecting an increased number of unit cells. Further, the power of the cell can be adjusted by selecting a connection pattern as appropriate.

The invention claimed is:

1. A fuel cell comprising:
a plurality of unit cells each having a solid electrolyte membrane, a fuel electrode disposed on one surface of said solid electrolyte membrane, and an oxidizer electrode disposed on the other surface of said solid electrolyte membrane in opposition to said fuel electrode associated therewith, wherein said plurality of unit cells share said solid electrolyte membrane, and are electrically connected to each other by at least one electrically conductive member,
wherein a low ion conductive region of said solid electrolyte membrane is located between said unit cells, and the electrically conductive member is formed in a region other than the low ion conductive region.

2. The fuel cell according to claim 1, wherein said at least one electrically conductive member extends through said solid electrolyte membrane, wherein at least two of said plurality of unit cells are connected in series through said at least one electrically conductive member.

3. The fuel cell according to claim 1, further comprising a sealing material interposed between said at least one electrically conductive member and said solid electrolyte membrane.

4. The fuel cell according to claim 2, wherein said at least one electrically conductive member has a surface coated with an insulating material.

5. The fuel cell according to claim 3, wherein said at least one electrically conductive members has a surface coated with an insulating material.

6. The fuel cell according to claim 1, wherein said low ion conductive region is a region having a groove formed on said solid electrolyte membrane.

7. The fuel cell according to claim 6, wherein said groove is filled with an insulating resin.

8. The fuel cell according to claim 1, wherein said low ion conductive region is a region having at least one recess formed on said solid electrolyte membrane.

9. The fuel cell according to claim 8, wherein said at least one recess is filled with an insulating resin.

10. The fuel cell according to claim 7, wherein said insulating resin is selected from the group consisting of a fluorine-based resin, a polyimide-based resin, a phenol-based resin, and an epoxy-based resin.

11. The fuel cell according to claim 9, wherein said insulating resin is selected from the group consisting of a fluorine-based resin, a polyimide-based resin, a phenol-based resin, and an epoxy-based resin.

12. The fuel cell according to claim 1, further comprising a fuel flow path which covers said plurality of fuel electrodes, wherein said fuel flow path has a partition, part of which is comprised of said solid electrolyte membrane.

13. The fuel cell according to claim 1, wherein at least two of said plurality of unit cells are connected in parallel.

14. The fuel cell according to claim 1, wherein said fuel electrode and said oxidizing electrode each comprise a base, gas diffusion layer and a catalyst layer.

15. The fuel cell according to claim 1, wherein said solid electrolyte membrane has a high conductivity for hydrogen ions.

16. The fuel cell according to claim 1, wherein a material for forming said solid electrolyte membrane is selected from the group consisting of a strong acid group and an organic polymer having a weak acid group.

17. The fuel cell according to claim 16, wherein said strong acid group is selected from the group consisting of a sulfone group, a phosphate group, a phosphone group, and a phosphine group.

18. The fuel cell according to claim 16, wherein said organic polymer having a weak acid group is selected from the group consisting of a aromatic series containing polymers, sulfonic copolymers, fluorine containing polymers, acrylic amid class copolymers, perfluorocarbone containing a sulfone group, and perfluorocarbone containing a carboxyl group.

19. The fuel cell according to claim 14, wherein said base, gas diffusion layer is a porous base selected from the group consisting of carbon paper, carbon molding, carbon sinter, sintered metal, and foam metal.

20. The fuel cell according to claim 14, wherein said catalyst layer comprises carbon particulates holding a catalyst and solid polyelectrolyte particulates.

21. The fuel cell according to claim 20, wherein said catalyst is selected from the group consisting of platinum, rhodium, palladium, iridium, osmium, ruthenium, rhenium, gold, silver, nickel, cobalt, lithium, lanthanum, strontium, and yttrium, alone or in a combination of two or more.

22. The fuel cell according to claim 20, wherein said carbon particulates are selected from the group consisting of acetylene black, Ketjen Black, carbon nanotubes, and carbon nanohorns, wherein said carbon particulates have a diameter of 0.01 to 0.1 μm.

23. The fuel cell according to claim 1, wherein an organic fuel is applied in said fuel electrode, and said organic fuel is selected from the group consisting of methanol, ethanol, diethyl ether and a hydrogen containing gas.

* * * * *